US008219678B2

(12) United States Patent
Manolache et al.

(10) Patent No.: US 8,219,678 B2
(45) Date of Patent: Jul. 10, 2012

(54) APPLICATION VERIFICATION FOR HOSTED SERVICES

(75) Inventors: Doru Costin Manolache, Mountain View, CA (US); Braden Kowitz, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 678 days.

(21) Appl. No.: 11/706,170

(22) Filed: Feb. 13, 2007

(65) Prior Publication Data
US 2007/0192493 A1 Aug. 16, 2007

Related U.S. Application Data

(60) Provisional application No. 60/773,062, filed on Feb. 13, 2006, provisional application No. 60/773,060, filed on Feb. 13, 2006, provisional application No. 60/773,059, filed on Feb. 13, 2006.

(51) Int. Cl.
*G06F 15/173* (2006.01)
(52) U.S. Cl. ........................................ 709/225; 709/223
(58) Field of Classification Search .................. 709/200, 709/216, 220, 223, 225; 705/1
See application file for complete search history.

(56) References Cited

U.S. PATENT DOCUMENTS

| 6,269,395 | B1 | 7/2001 | Blatherwick et al. | 709/219 |
|---|---|---|---|---|
| 6,286,013 | B1 | 9/2001 | Reynolds et al. | 707/200 |
| 6,510,523 | B1* | 1/2003 | Perlman et al. | 726/6 |
| 6,871,232 | B2* | 3/2005 | Curie et al. | 709/225 |
| 7,324,473 | B2 | 1/2008 | Corneille et al. | 370/328 |
| 7,519,708 | B2 | 4/2009 | Malik | 709/225 |
| 2003/0120680 | A1 | 6/2003 | Agrawal et al. | 707/103 |
| 2003/0130960 | A1* | 7/2003 | Fraser et al. | 705/75 |
| 2004/0064561 | A1 | 4/2004 | Parsons et al. | 709/226 |
| 2004/0143464 | A1 | 7/2004 | Houle et al. | 705/4 |
| 2004/0201625 | A1* | 10/2004 | Karamchedu et al. | 345/752 |

(Continued)

FOREIGN PATENT DOCUMENTS
WO   WO 2004/029821 A1   4/2004

OTHER PUBLICATIONS

"Domain Name Hijacking: Incidents, Threats, Risks, and Remedial Actions", A Report from the ICANN Security and Stability Advisory Committee (SSAC). Jul. 12, 2005.*

(Continued)

*Primary Examiner* — Jeffrey Pwu
*Assistant Examiner* — Scott M Sciacca
(74) *Attorney, Agent, or Firm* — Morgan, Lewis & Bockius LLP

(57) ABSTRACT

In a client-server environment providing hosted services, an application service server receives from a client a first request for hosted services associated with a user-specified domain name. If the server does not provide hosted services for that domain name, the server designates the first request as pending and provides a limited set of the hosted services in association with the first request. The server provides a complete set of the hosted services requested in the first request if it can be established that a first user associated with the first request has appropriate authority to make administrative changes for the network domain designated by the domain-name. In some embodiments, the server denies the first request and cancels the limited services if it is not shown within a predetermined period of time that the first user has the appropriate authority.

31 Claims, 13 Drawing Sheets

U.S. PATENT DOCUMENTS

| | | | | |
|---|---|---|---|---|
| 2005/0075115 | A1 | 4/2005 | Corneille et al. | 455/456.3 |
| 2005/0108423 | A1* | 5/2005 | Centemeri | 709/237 |
| 2005/0144238 | A1* | 6/2005 | Morin et al. | 709/206 |
| 2006/0036701 | A1* | 2/2006 | Bulfer et al. | 709/206 |
| 2006/0101113 | A1* | 5/2006 | Lemson et al. | 709/203 |
| 2006/0213975 | A1 | 9/2006 | Krishnan et al. | 235/380 |
| 2007/0067395 | A1* | 3/2007 | Blinn et al. | 709/206 |
| 2007/0078934 | A1* | 4/2007 | Gardner | 709/206 |
| 2008/0005127 | A1 | 1/2008 | Schneider | 707/10 |

OTHER PUBLICATIONS

International Search Report and Written Opinion for International application No. PCT/US07/03984, mailed Feb. 19, 2008.

European Search Report for European Patent Application No. 07750797.8, dated Jul. 7, 2010, 12 pages.

Rodgers, G., "GMail Code Hints at Coming Domain Feature," http://www.zdnet.com/blog/google/gmail-code-hints-at-coming-do, Feb. 8, 2006, 8 pages.

"NIH Listserv Facility User's Guide," Oct. 2001, http://web.archive.org/web/20050114123058/http://list.nih.gov/LI, Oct. 2001, pp. 1-17.

Fleming, *Securing your NetWare user IDs*, Inside NetWare, Louisville, Sep. 2000, vol. 9, Iss. 9, 12 pgs.

Office Action for Related EP Application 07750797.8, Jul. 8, 2011, 5 pgs.

* cited by examiner

Figure 7B

| ASP Logo | For company.com | | Search Accounts |
|---|---|---|---|
| | | | 706 |

| Dashboard | User accounts | Domain settings | Advanced tools | Service settings |

Domain settings

General | Domain names | Access | Account information

Primary domain — company.com
770 — Registered since Aug 21 2006 with GoDaddy.com Learn more Change DNS settings
Sign in to GoDaddy.com to change your MX records, CNAME and other advanced DNS settings.

Automatic renewal — ☐ Automatically renew my domain registration every year
772 — Next renewal date is Aug 21 2007, $10 per year - Billing information

Domain alias — company.org - Active
774 — Activate alias  Remove alias company.tv - Active
Remove alias company.google-asp.com - Test domain

Add a domain alias
Associate another domain with this account to let your users share the same mailbox with multiple email addresses Learn more

[ Save changes ]  [ Cancel ]

Figure 7E

APPLICATION VERIFICATION FOR HOSTED SERVICES

RELATED APPLICATIONS

This application claims priority to U.S. Provisional Patent Application 60/773,062, "Applicant Verification for Hosted Services," filed on Feb. 13, 2006, which is hereby incorporated by reference in its entirety.

This application claims priority to U.S. Provisional Patent Application 60/773,060, "Deleted Account Handling for Hosted Services," filed on Feb. 13, 2006, which is hereby incorporated by reference in its entirety.

This application claims priority to U.S. Provisional Patent Application 60/773,059, "Account Administration for Hosted Services," filed on Feb. 13, 2006, which is hereby incorporated by reference in its entirety.

FIELD

The present invention relates generally to the field of client-server computer network systems, and in particular, to systems and methods for managing hosted services.

BACKGROUND

Today, many organizations provide services to their clients and members through a computer network such as the Internet or an intranet. Typical network-based services include communication, individual data management, web management, e-commerce, etc. With the demand for more services and services with more features, it becomes an increasingly challenging task for an organization to provide reliable and scalable services to its clients and members. As a result, many organizations have chosen to delegate the task to a third-party service provider, which is also known as an Application Service Provider (ASP) or Internet Service Provider (ISP).

Third-party service providers deliver hosted services for subscriber organizations using the third party's own computing infrastructure (hardware and software) and service personnel. Services such as email or webpage serving are delivered by a third party service provider as if they were being delivered by the subscriber directly. For example, hosted email or web services for a particular subscriber "Sub1" are associated with that subscriber's own domain "Sub1.org." As a result, emails sent by or to employees of the subscriber "Sub1" using hosted email services are sent from or delivered to users "@Sub1.org" and hosted web pages for the Sub1 organization load from the "Sub1.org" domain. Hosting is convenient for subscribers, but the process of offering hosted services and signing up new subscribers presents third party service providers and the larger Internet community with some challenges.

One challenge faced by ASPs and ISPs is the need to detect and prevent attempts by users/new subscribers to hijack existing domains or misuse hosted services. For example, subscribers cannot be allowed to use hosted email services to send out Spam email, or to sign up for hosted services without the proper authority to do so. As another challenge, ASPs and ISPs need to provide tools that enable subscriber organizations to manage accounts and services for users almost as if the hosted services were being provided by the subscriber organizations directly.

SUMMARY

In a client-server environment providing hosted services, an application service server receives from a client a first request for hosted services associated with a user-specified domain name. If the server does not provide hosted services for that domain name, the server designates the first request as pending and provides a limited set of the hosted services in association with the first request. The server provides a complete set of the hosted services requested in the first request if it can be established that a first user associated with the first request has appropriate authority to make administrative changes for the network domain designated by the domain-name. In some embodiments, the server denies the first request and cancels the limited services if it is not shown within a predetermined period of time that the first user has the appropriate authority.

If the server is providing limited services for the first request and subsequently receives a second request for the same user-specified domain name, the server asks a second user associated with the second request to establish that it has appropriate authority to make administrative changes for the network domain designated by the domain-name. If, within a pre-defined time period, it is established that the sound user has the appropriate authority, the server terminates the limited set of the hosted services in association with the first request and provides a complete set of the hosted services requested in the second request.

If the server already provides hosted services for the domain name specified in the first request, the server denies the first request.

In a client-server environment providing hosted services, an application service server receives a request to delete a user account associated with a user of the hosted services. Accordingly, the server deactivates the user account to prevent the user from accessing the user account for a predefined probation time period. If the server receives an account revival request before the predefined probation time period is over, the server then undoes the deactivation and transfers the user account's status from "inactive" to "active". If no account revival request is received at the end of the probation time period, the server then deletes the user account from the client-server environment.

A graphical user interface for rendering hosted services includes a set of hosted service identifiers associated with a domain name. The set of hosted service identifiers is further broken down into a first subset of service identifiers and a second subset of service identifiers. Each identifier in the first subset corresponds to a service provided by a first service provider and each identifier in the second subset corresponds to a service provided by a second service provider. One of the services provided by the first service provider is rendered in response to a user selection of one of the first subset of service identifiers. One of the services provided by the second service provider is rendered in response to a user selection of one of the second subset of service identifiers.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

FIGS. 7A-7E are block diagrams of graphical user interfaces (GUI) used by a service administrator to manage user accounts of hosted services according to some embodiments.

Like reference numerals refer to corresponding parts throughout the several views of the drawings.

DESCRIPTION OF EMBODIMENTS

Figure 1:
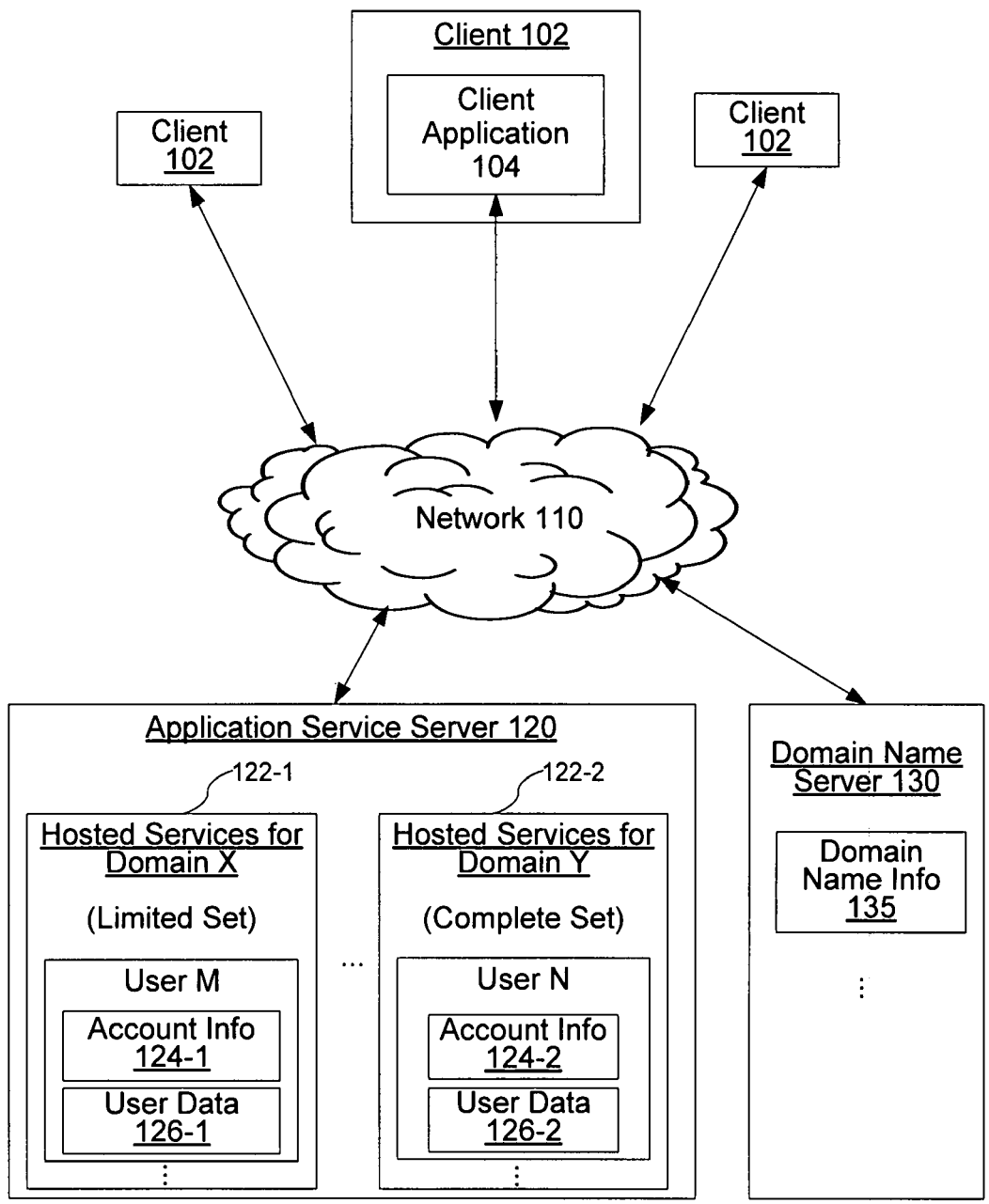
FIG. 1 is a block diagram illustrating the infrastructure of a client-server network environment according to some embodiments.

FIG. 1 is a block diagram illustrating the infrastructure of a client-server distributed system 100 according to some embodiments. The distributed system 100 includes a plurality of clients 102, an application service server 120, and a domain name server 130, which are connected to each other through a network 110 such as the Internet. In some embodiments, the internal structure of a client 102 includes a client application 104 such as a web browser. In some other embodiments, the application service server 120 and the domain name server 130 are merged together and operate on the same computer server.

A respective client 102 (or in some embodiments, the client application 104 within the respective client 102) is connected to the application service server 120 and the domain name server 130, respectively, through the network 110. The client 102 (sometimes herein called the "client device" or "client computer") may be any computer or similar device through which a user of the client 102 can submit requests to and receive services from the application service server 120. Examples include, without limitation, desktop computers, notebook computers, tablet computers, and mobile devices such as mobile phones and personal digital assistants, and set-top boxes.

In some embodiments, the application service server 120 provides multiple hosted services associated with different domain names simultaneously. As shown in FIG. 1, there are a limited set of hosted services 122-1 associated with domain "X" and a complete set of hosted services 122-2 associated with domain "Y". A more detailed explanation of the terms "limited set" and "complete set" is provided below in connection with FIG. 3.

In some embodiments, a set of hosted services has one or more user accounts including at least one administrator account and multiple regular user accounts. As shown in FIG. 1, each user account has associated account information 124 and user data 126. A more detailed description of the account information 124 is provided below in connection with FIG. 2.

For convenience, the application service server 120 is treated as though it were a single computer in this application. In reality, the application service server 120 may include a cluster of computers to serve a large number of clients efficiently.

In some embodiments, the domain name server 130 includes information 135 for many domain names. The domain name server 130 is responsible for mapping a domain name to an IP address. Before providing any service associated with a domain name, the application service server 120 ensures that the domain name has a matching entry at the domain name server 130. If the service request is approved, the service applicant is responsible for updating the corresponding entry in the domain name information 135 to direct service requests to the application service server 120. For illustrative purpose, it is assumed in the following description that an applicant from an organization is seeking email service from the application service server 120. But the principle discussed below is applicable to other types of services, including web hosting, application hosting or digital media streaming and hosting, to name a few representative possibilities.

Figure 2:
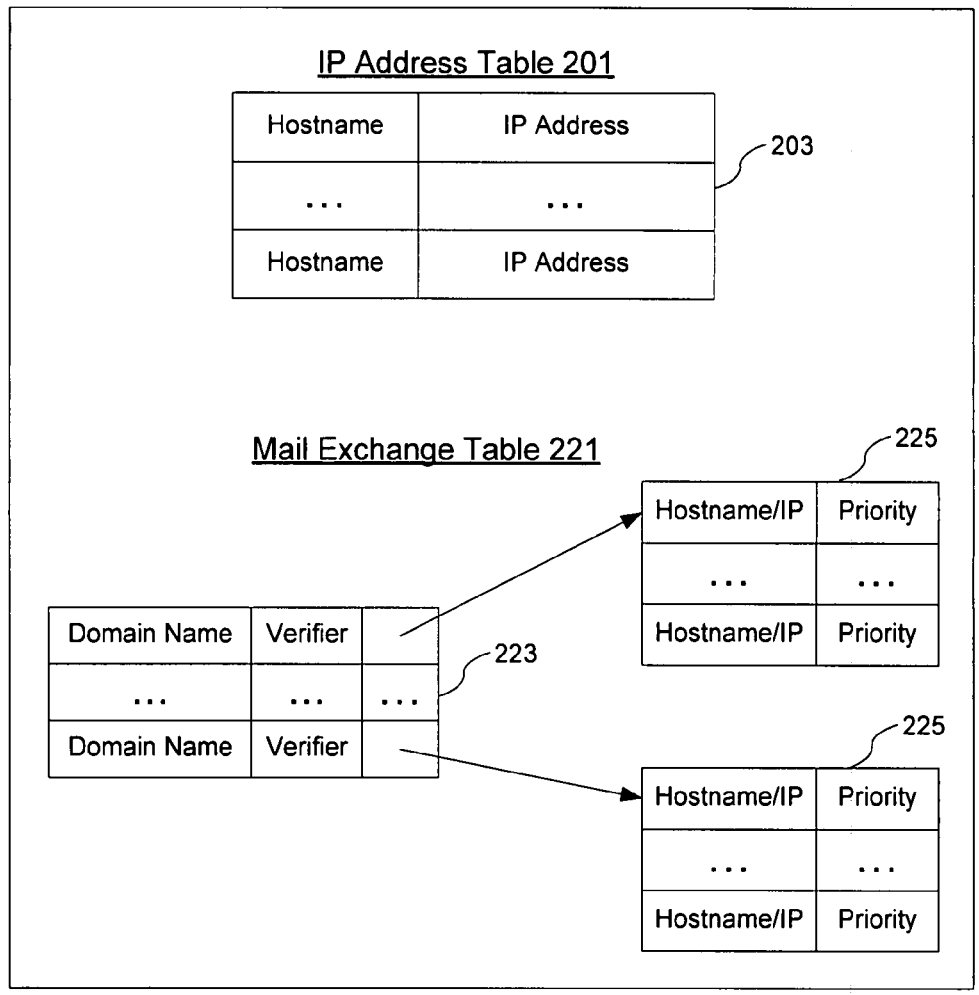
FIG. 2 illustrates data structures associated with several components of the client-server network environment according to some embodiments.

FIG. 2 illustrates data structures associated with several components of the client-server network environment according to some embodiments. The domain name information 135 has several data structures, including an IP address table 201 and a mail exchange table 221.

The IP address table 201 includes one or more records 203, each record mapping a hostname to an IP address. The term "hostname" refers to the identifier of a service or information source at a network location such as a universal resource locator (URL) associated with a web server. The mail exchange table 221 includes one or more records 223, each record having a domain name, a verifier, and a pointer at a sub-table including one or more hostnames of mail exchange servers and their respective priorities.

In some embodiments, to deliver an email message to a recipient, a mail transfer agent at a client 102 first queries the domain name server 130 for the mail exchange record associated with the recipient's domain name, which is typically the portion of an email address after the "@". If a matching mail exchange record is found in the mail exchange table 221, the domain name server 130 returns a set of hostnames (or IP addresses) of the mail exchange servers corresponding to the domain name. The mail transfer agent then attempts to establish a network connection to one of these mail exchange servers, starting with the one having the highest priority, and delivers the email message to the first mail exchange server in the list with which a connection can be made. If no matching mail exchange record is present, the mail transfer agent submits a second request to the domain name server 130 for the IP address record of the domain name in the IP address table 201.

As shown in FIG. 2, the user account information table 124 includes multiple records, each record corresponding to a particular user of the hosted service. The record breaks a user account's information into several fields, including user name, account status, nickname, service information, and last visit by the user. A more detailed description of these fields is provided below in connection with FIGS. 7A-7E.

Depending on the specific service rendered for a user account associated with a domain name, the user data associated with the user account includes email messages, web pages, calendars, photos, and other types of digital contents.

As an initial step of obtaining hosted services for a specific domain, an applicant submits a service request to a service provider that can provide the hosted services using one or more application servers 120. The service request includes the domain name, information about an organization associated with the domain, and a description of the services sought by the organization. Note that an organization can be a company, an individual, an educational institution, a cooperative, a member association, or other collection of users. A process for determining the type of hosted services, if any, to be provided to a service applicant according to some embodiments is now described in reference to FIG. 3.

In this description reference is made to a "limited set of services" and a "complete set of services." For purposes of the present patent application, a "limited set of services" is typically a constrained set of services provided by a service provider for a request that is still pending. In contrast, a "complete set of services" refers to the whole set of services requested by an applicant, which is provided by the service provider once their service request is "approved." For example, in some embodiments, if a user requests hosted email services, the limited set of services might comprise the rights to create accounts and send (but not receive) a limited number of emails (to prevent spamming) whereas the corresponding complete set of services might include full email rights, including the right to send, receive and forward email. The concept of limited and complete services applies to other (but not necessarily all) types of hosted services but varies depending on the particular services concerned. An advantage of providing two different levels of service in this manner is that limited services can be provided while a service request is pending to allow an applicant to set up accounts and test basic services while preventing an unprincipled applicant from obtaining broader rights that could prejudice a legitimate owner of the domain or damage other users of the computer network 110 (e.g., if the applicant obtains enough rights to sending spam email from their pending account).

Figure 3:
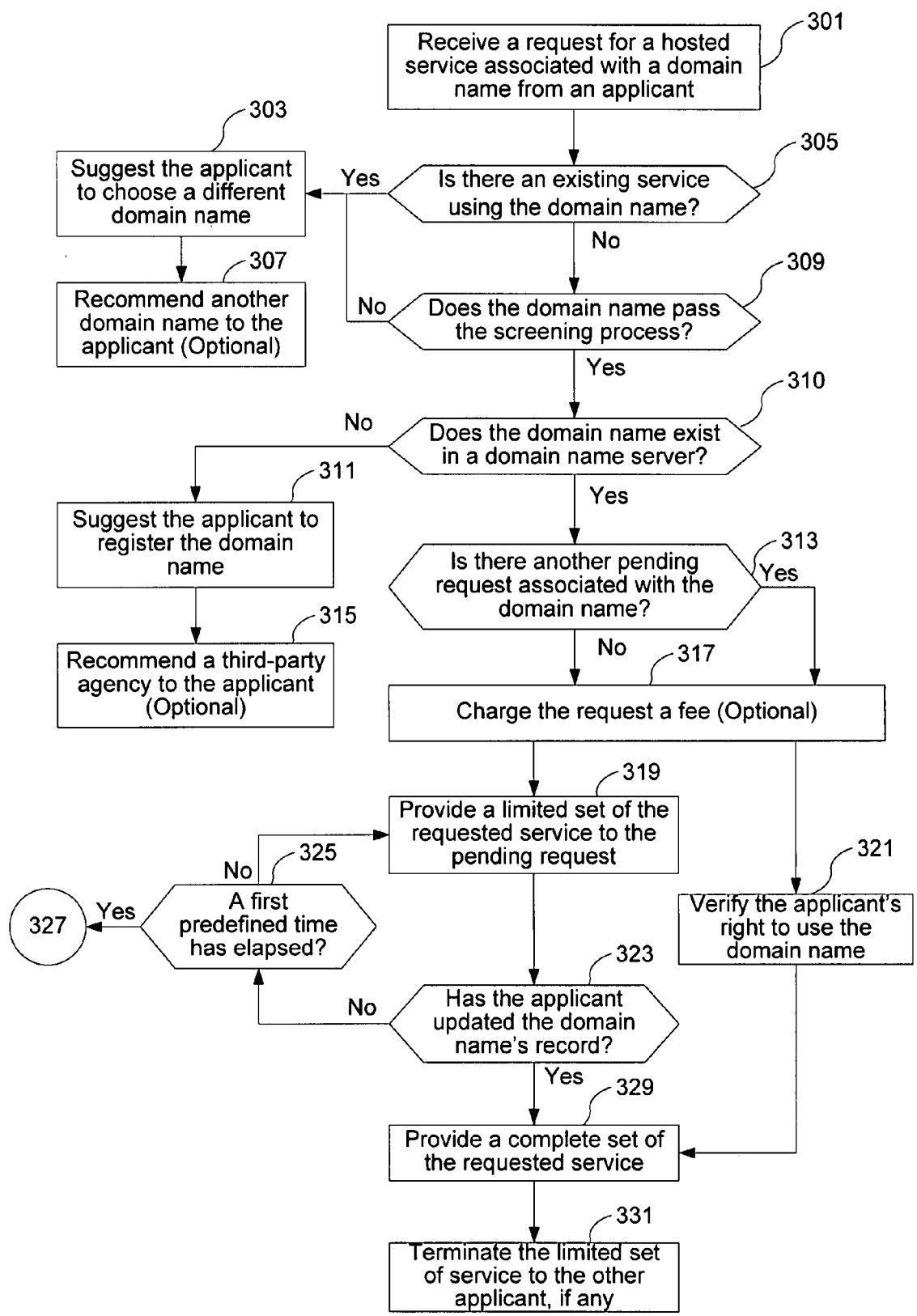
FIG. 3 is a flowchart illustrating a process of determining the type of hosted services, if any, to be provided to a service applicant according to some embodiments.

FIG. 3 is a flowchart that illustrates a process for determining the type of hosted services, if any, to be provided to a service applicant according to some embodiments. As an initial step, upon receipt of a first request for hosted services associated with a user-specified domain name (301), the application service server 120 performs one or more checks of the user-specified domain name before rendering any service.

If a complete set of hosted services is currently being provided for the domain name (305, yes), the application service server 120 denies the first service request.

In some embodiments, the application service server 120 sends a reply message to the applicant associated with the first service request, suggesting that the applicant choose a different domain name (303). In some other embodiments, the application server 120 optionally recommends another domain name to the applicant (307). For example, the application service server 120 can query the domain name server 130 to get a list of available domain names associated with the applicant's organization and recommend one or more domain names in the list to the applicant.

If no complete set of the hosted services is being provided for the domain name (305, no), the application service server 120 conducts a screening process for the user-specified domain name (309). In some embodiments, the screening process evaluates: (i) whether the domain name includes any inappropriate terms from a predefined set of such terms (e.g., terms related to sex or violence, or other terms generally deemed inappropriate by the public), (ii) whether the domain name includes a well-known trademark (where the applicant is not affiliated with an entity owning the trademark), and (iii) whether the domain name includes any term that the service provider would prefer not to be associated with. If the domain name fails the screening process (309, no), the server 120 also denies the service request and optionally repeats the operations 303, 307.

If the domain name passes the screening process (309, yes), the server 120 then queries the domain name server 130 to determine whether the domain name is an existing entry in the domain name server's database (310). In some embodiments, the application service server 120 denies the first service request if the user-specified domain name does not exist in the database (i.e., no one has registered this domain name). In some other embodiments, the application service server 120 sends a reply message to the applicant, suggesting a procedure for registering the domain name (311). Sometimes, the application service server 120 may optionally recommend a third-party domain name registration agency to the applicant (315) or offer to register the user-specified domain name for the applicant.

Next, the application service server 120 checks if there is another pending service request associated with the same domain name (313). If the hosted services are not being provided for any request associated with the domain name (313, no), the application service server 120 optionally requests a service fee from the applicant (317). In some embodiments, the service fee is a small amount used mainly to prevent users from abusing the services offered by the server 120. Upon receipt of the service fee, the application service server 120 designates the first service request as a pending request and provides a limited set of the hosted services in association with the user-specified domain (319).

As noted above, the term "limited set of hosted services" is relative to the term "complete set of hosted services" discussed above. It refers to a subset of the services requested by an applicant before the user-specified domain name passes all the checks designed by the server 120. Note that a service request that passes the aforementioned checks 305, 309, 310 has not necessarily been established (by the application service server 120) to be genuine (meaning that it was issued by an applicant with the appropriate authority to request the specified services for the specified domain name). In some embodiments, to prevent cybersquatting or other abuse of the hosted services, the application service server 120 only provides a limited set of the requested services to the applicant. The limited set of the hosted services provided in response to the first request may enable the applicant associated with the first service request to create a set of user accounts and allow a user associated with one of the user accounts to log into the user account and view digital contents associated with the user account. The hosted services can include email services and digital content management services, or other types of hosted services.

For example, if the applicant requests an email service including sending and receiving email messages, the limited email service may only allow a user to send less than a predefined number of messages. The limited email service may also prevent a user from receiving any email message delivered to the user. In other words, the application service server 120 can use the limited hosted services to effectively prevent or reduce the impact caused by an abusing user's misbehavior.

In some embodiments, the application service server 120 may become aware of, or receive, a second pending services request associated with the same domain name (313, yes). In this case, the application service server 120 will have to choose one of the first and second requests as the only qualified request to receive the hosted services and subsequently provide a complete set of the hosted services to only the chosen services request. In some embodiments, the application service server 120 does so by first verifying whether the respective applicants for the first and second requests have sufficient rights to use (or modify administrative information about) the domain name (321). For example, the server 120 requests a second user associated with the second request to establish that it has appropriate authority to make administrative changes for the network domain designated by the domain-name. If the second user establishes that that it has appropriate authority to make administrative changes for the network domain designated by the domain-name with a pre-defined time period, the server 120 then terminates the limited set of the hosted services in association with the first request and provides a complete set of the hosted services requested in the second request. Of course, it might be the case that neither applicant associated with the first or second requests has the appropriate authority, in which case both services requests would be denied. One embodiment of a process for verifying that an applicant associated with a service request has sufficient authority to use a specified domain name is not described in reference to FIG. 4.

Figure 4:
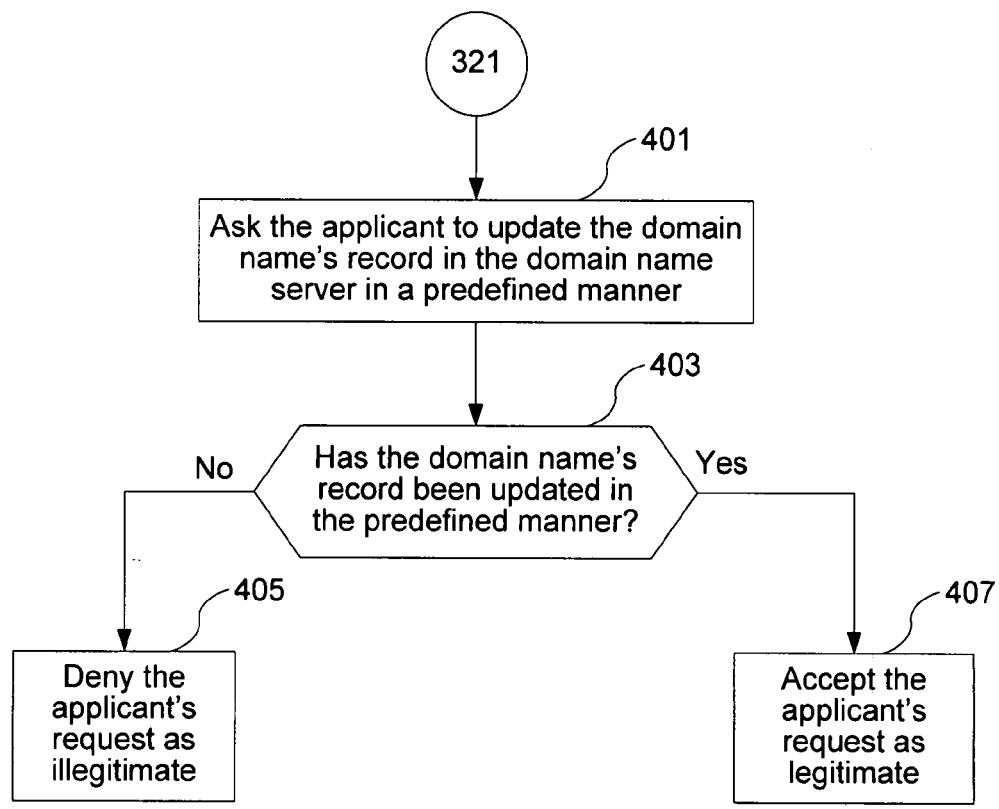
FIG. 4 is a flowchart illustrating a process of verifying whether an applicant has rights to use a domain name according to some embodiments.

FIG. 4 is a flowchart that illustrates a process for verifying whether an applicant has sufficient rights to use a domain name according to some embodiments. The application service server 120 sends a message to an applicant, asking the applicant to update the domain name's record in the domain name server 130 in a predefined manner (401). For example, the application service server 120 assigns a unique number to the applicant and asks the applicant to update the verifier field of the domain name's record in the mail exchange table 221 within a predefined time period (e.g., a day or two).

After the predefined time period, the application service server 120 queries the domain name server 130 for the domain name's record in the mail exchange table 221. If the verifier field has been updated in the predefined manner, e.g., using the unique number provided by the server 120 (403, yes), the application service server 120 then accepts the applicant as a legitimate user of the domain name (407). Otherwise (403, no), the server 120 deems the applicant as illegitimate and denies its service request associated with the domain name (405).

Referring again to FIG. 3, based on the outcome of the operation 321, the application service server 120 may provide a complete set of the hosted service to the second service request (329) and terminate the limited set of hosted services provided in response to the first request if such services exist (331). If the applicant associated with the second request fails to establish its authority to use the domain name, the server 120 then denies the second request and continues the limited services associated with the first request until a predefined time period is over.

Assume that while the application service server 120 is providing a limited set of hosted services in association with the first request, the second request arrives at the server 120. In this situation, the application service server 120 may implement an expedite identity checking procedure by asking the applicants for both the first and second service requests to establish their rights to use the domain name for securing the hosted services. If the applicant of the second request establishes its right to use the domain name, the application service server 120 provides the complete set of the hosted service to the second request. If the first request has already received the limited set of the hosted service, the application service server 120 terminates the limited set of the hosted services in association with the first request.

Alternatively, if the applicant of the first request establishes its right to use the domain name, the application service server 120 upgrades the limited set of the hosted services to the complete set of the hosted service. Meanwhile, the application service server 120 denies the second request.

Returning to the case where the application service server 120 provides the limited set of services to the first request (319), the applicant is given a first time window to upgrade its service to the complete set by modifying the domain name's record in the domain name server 130. This is essentially the same as the operation of verifying whether an applicant can establish its right to use the domain name for securing the hosted services (321). The process described above in connection with FIG. 4 can be repeated here to serve the same purpose. In some embodiments, the applicant is requested to update the domain name's mail exchange record in the domain name server 130 within the first time window, e.g., in order to receive email service from the application service server 120.

During the first time window, the application service server 120 periodically checks whether the applicant has updated the domain name's record in a predefined manner, e.g., by pointing the domain name's mail exchange record to the application service server (323). If the record has been updated (323, yes), the application service server 120 upgrades the limited set of services to the complete set of services (329). Otherwise (323, no), the application service server 120 checks if the first time window has elapsed (325). If false (325, no), the limited set of hosted services continues. If true (325, yes), the application service server 120 has to decide whether the limited set of services should continue or not.

Figure 5:
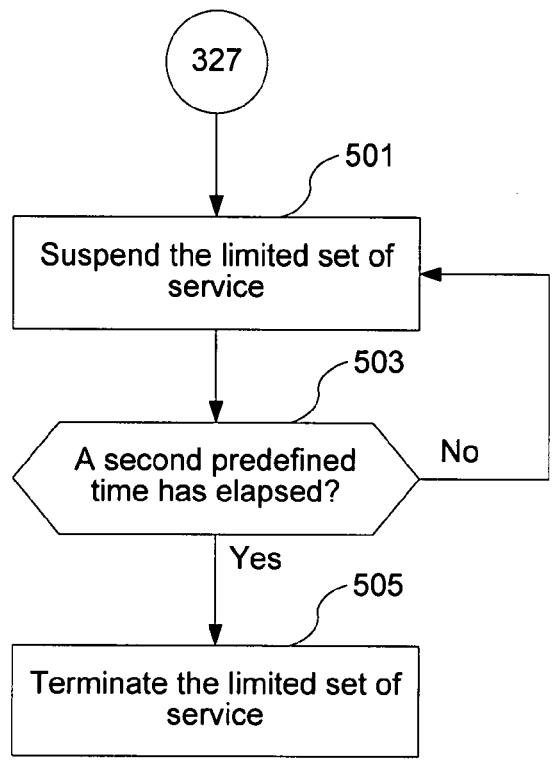
FIG. 5 is a flowchart illustrating a process of suspending and then terminating the limited set of hosted services provided to a service applicant according to some embodiments.

FIG. 5 is a flowchart illustrating a process of suspending and then terminating the limited set of hosted services provided to a service applicant according to some embodiments. If the first time window has expired, the application service server may suspend the limited set of the hosted services in association with the first request (501). As a result, users cannot access the limited set of services through their accounts associated with the domain name. But their accounts still exist in the application service server 120. Subsequently, if a second time window has elapsed and the applicant still has not updated the domain name's record (503), the application service server may terminate the limited set of the hosted services in association with the first request and delete the user accounts and user data associated with the domain name (505). In some embodiments, the first time window is one week and the second time window is one month including the first time window.

After the complete set of hosted services is rendered (329), an administrator of the services (who is typically the applicant who requested the hosted services) can create new user accounts on the application service server 120 and forward the login information of the user accounts to their respective users. A user can then log into the user's account and use the hosted services. In some embodiments, different users of the hosted services have different privileges. An administrative user typically has more privileges than a regular user. For example, an administrator can create new user accounts, delete existing user accounts, and allocate resources among different user accounts. In some embodiments, a set of hosted services for a domain name may have multiple administrators. They all have the rights to create/delete user accounts.

Wrongful account deletion results in the elimination of a user account and its associated information including the user name and user data associated with that user name such as email messages and address book information. Therefore, it is useful to have a mechanism to prevent a user account from being wrongfully deleted by an administrator. For convenience, the following description assumes that the user account is associated with a hosted email service. But one skilled in the art can easily extend the invention described here to other types of hosted services.

Figure 6:
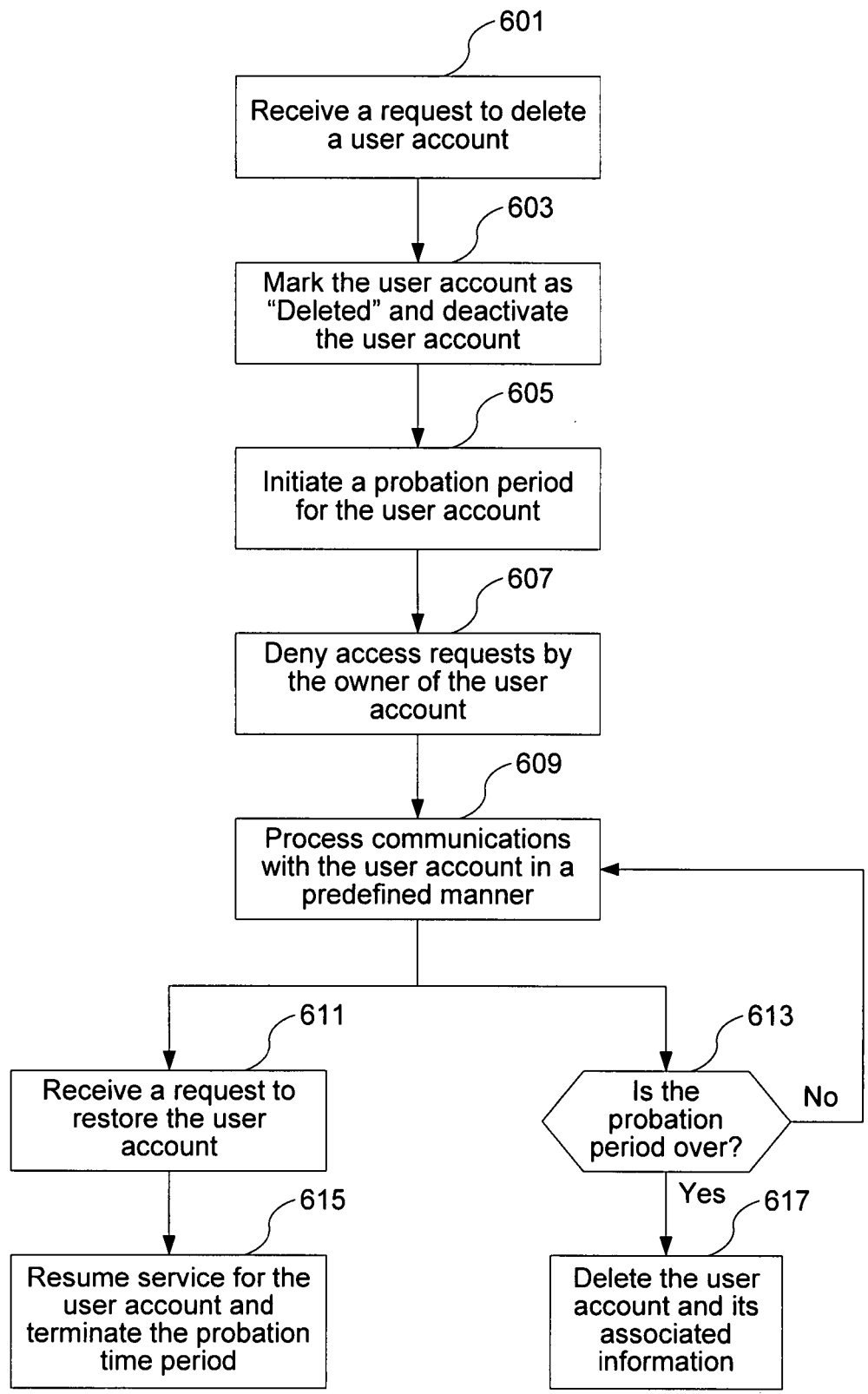
FIG. 6 is a flowchart illustrating a process of deleting a user account from a hosted service according to some embodiments.

FIG. 6 is a flowchart illustrating a process of deleting a user account from a hosted service according to some embodiments. Upon receiving a request to delete a user account (601), the application service server 120 marks the user account as "Deleted" and deactivate the user account (603). The user account's status switches from "active" to "inactive". Existing account information and user data associated the deleted user account are retained by the server 120 and available to only user with administrative privileges.

In some embodiments, deactivating the user account includes changing an original username of the user account to an alternative username while maintaining account information and user data associated with the user account under the alternative username. The alternative username is deemed as an invalid username by the hosted services. In some embodiments, the alternative username is derived from the original username. As a result, an administrator can easily access the status information of all user accounts that are currently on probation.

Next, the application service server 120 initiates a predefined probation time period (e.g., a week) for the deactivate user account (605). During this probation time period, the application service server 120 denies any access request to the user account by its owner (607) and processes any new communications with the user account in a predefined manner (609).

In some embodiments, the application service server 120 records a deletion timestamp identifying when the user account is deactivated. This deletion timestamp is used to determine whether the user account's probation time period is over or not. Like the account information and the user data, the deletion timestamp is also associated with the alternative username. In some embodiments, the application service server 120 stores the deletion timestamp and the alternative username together for easier maintenance.

In some embodiments, the user account cannot receive any new email messages directed to the account owner during the probation time period. Upon receipt of a new message addressed to the deleted user account, the application service server may drop the message and optionally send a reply message to the sender indicating that the user account has been deactivated or deleted.

In some other embodiments, the application service server 120 accepts new email messages on behalf of the account owner and stores them messages at a predefined location in a predefined manner. If the user account is subsequently revived, the application service server 120 can restore the email messages and make there available to the account owner. For example, an administrator can reuse the username of the deleted user account as a nickname or an email list so that email messages intended for the deleted user account can be captured.

Because the application service server 120 retains a deactivated user account and its associated data, the user account can therefore be revived at any time during the probation time period. For the same reason, any requests to create a new account using the same username are not allowed. As shown in FIG. 6, upon receipt of a request to restore the user account (611), the application service server 120 revives the user account, brings back the hosted services associated with the user account, and terminates the probation time period (615). If the user account's username has been changed to an alternative username previously, the application service server 120 restores the user account's information and user data by changing the alternative username back to the original username.

But if the application service server 120 does not receive any account restoration request until the end of the probation time period (613, yes), the application service server 120 deletes the user account and its associated information (617). The username of the deleted user account can be reused, e.g., for a new user or for other purposes such as a nickname or an email list.

User account management of hosted services is more than creating and deleting a user account. For example, if not every user has the same privilege to access the services, an administrator needs to ensure that a user can only access the services that the user is authorized to access. Sometimes, a service provider does not have information about every aspect of a user's activities for reasons like privacy. However, it is desirable for an administrator to monitor the user activities closely. Therefore, an intuitive user interface that enables an administrator to manage user accounts associated with a domain name is desirable.

Figure 7A:
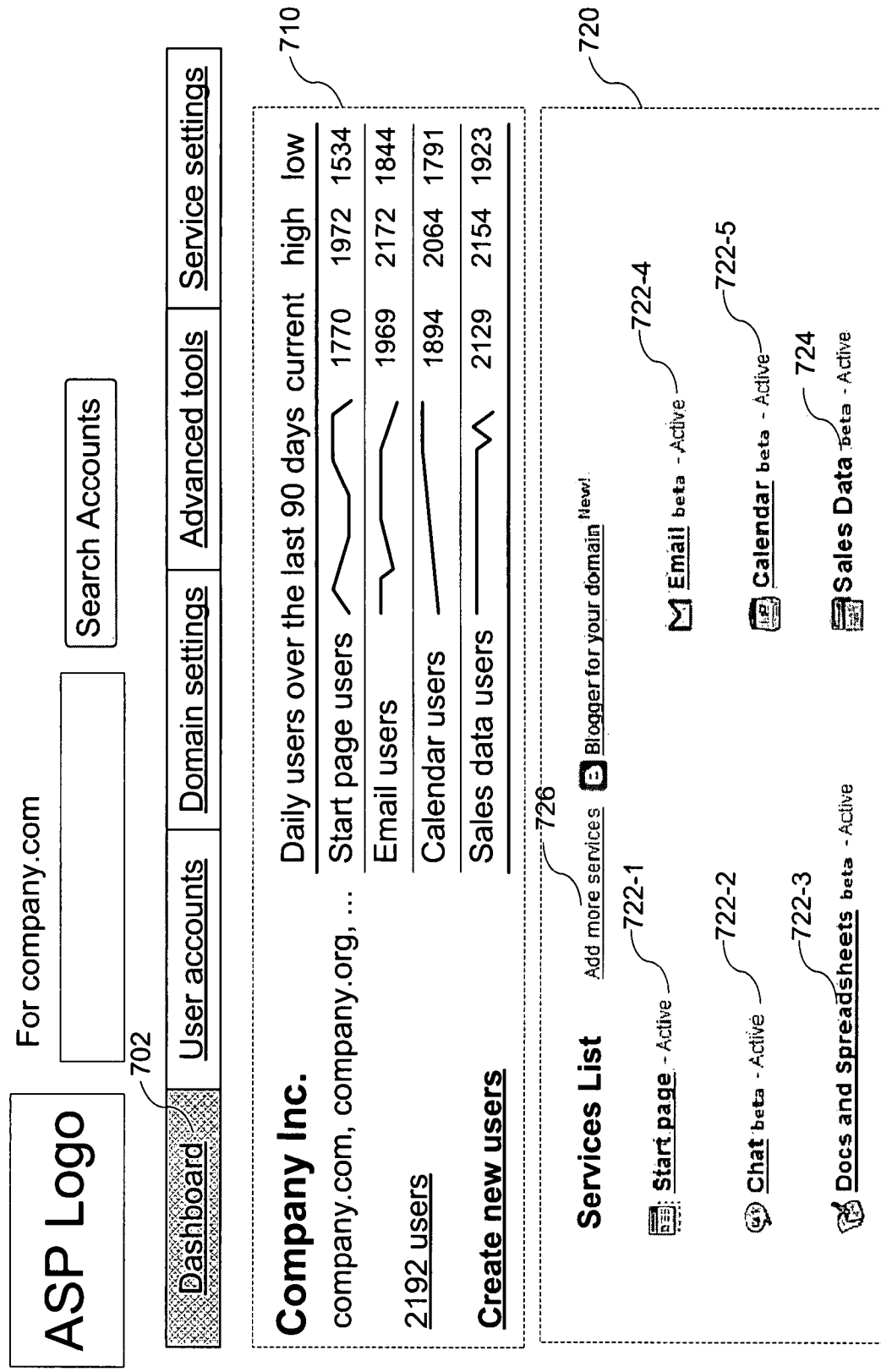

FIGS. 7A-7E are block diagrams of graphical user interfaces (GUI) used by a service administrator to manage user accounts of hosted services according to some embodiments. For example, FIG. 7A is an overview screenshot of a GUI for managing the user accounts associated with the domain name "company.com". A list of top-level management subjects is shown at the top of the screenshot, including "Dashboard" (702), "User accounts", "Domain settings", "Advanced tools", and "Service settings".

At the lower portion of the screenshot is a set of hosted service identifiers 720 associated with the domain name "company.com". Some of the hosted service identifiers such as "Start page" 722-1, "Chat" 722-2, "Docs and Spreadsheets" 722-3, "Email" 722-4, and "Calendar" 722-5 correspond to services provided by a first service provider. Some other service identifiers, e.g., "Sales Data" 724, correspond to services provided by a second service provider. In some embodiments, the first service provider is the owner of the application service server 120 on which the hosted services operate and the second service provider is a third party that has an agreement with the first service provider to use their application service server 120 to host at least a portion of the services provided by the second service provider. An administrator can subscribe to more services by clicking the link "Add more services" 726.

In some embodiments, the application service server 120 renders one of the services (e.g., email service) provided by the first service provider in response to a user selection of one of the first subset of service identifiers (e.g., Email 722-4). If the user selects one of the second subset of service identifiers (e.g., Sales Data 724), the application service server 120 then renders the service provided by the second service provider. In this case, the application service server may communicate with the second service provider's computer system or pre-install the software designed to provide such service.

As shown in FIG. 7A, the screenshot also displays statistical information 710 associated with some of the services provided by the first and second service providers. In this example, the statistical information 710 includes high, low, and average daily user counts of the services such as "Start page", "Email", "Calendar", and "Sales Data". The application service server 120 collects the user counts during a predefined time period (e.g., 90 days) and generates a curve plot for each service. In some embodiments, the user interface also includes a count of users currently using each service.

Figure 7B:
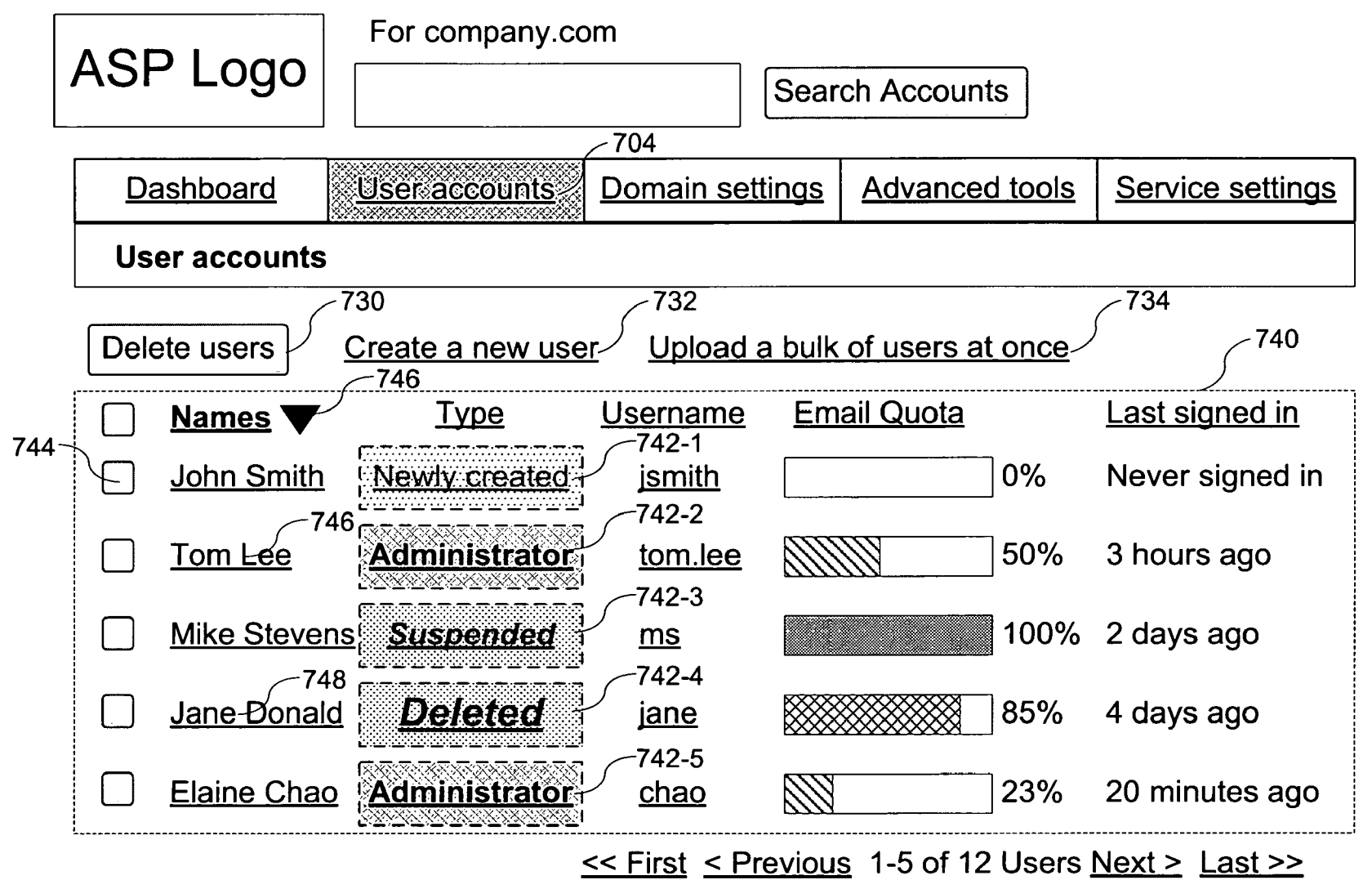

FIG. 7B depicts a graphical user interface that displays a list of user account records associated with the domain name "company.com" when an administrator selects the "User accounts" link 704. In some embodiments, each user account record corresponds to a respective user. The record has multiple information fields, including a user's name, an account type, an account name, an account resource indicator, and a timestamp indicating last visit by the user. The form of the account resource indicator depends on the service being rendered. In this example, a progressive bar is used to demonstrate the space allocated for a user of the hosted email service and its usage. The user account records can be sorted by some of the information fields (e.g., the name field).

In some embodiments, there are multiple account types, including "Newly Created", "Suspended", "Active", "Administrator", and "Deleted". As shown in FIG. 7B, different account types in the group can be displayed using distinct colors, distinct backgrounds, distinct font styles, and distinct font sizes. For example, the account type "Deleted" is displayed in red, bold, and underlined character to get the administrator's attention. An administrator can upload a large number of users into the application service server 120 using the "Upload a bulk of users at once" link 734. This is especially convenient if the administrator moves user accounts from another service provider to the application service server 120.

Figure 7C:
Figure 7D:

FIGS. 7C and 7D are screenshots depicting additional information of a user account in response to a user selection of a user account record. For example, a user account may have one or more nicknames 750. Therefore, the user may have one or more email addresses associated with the domain name and one of them includes the user's account name "tom.lee". The relationship between the nickname "tl" and the username "tom.lee" is similar to the relationship between an alias and a canonical name (CNAME) in the domain name server. A user account can be a member of one or more email lists. An email message to the email list admin@company.com is automatically delivered to tom.lee@company.com because Tom Lee is an administrator.

As shown in FIG. 7D, since the user account "Jane Donald" is marked as "Deleted", the additional information associated with the user account includes a message 760 that indicates a residual of the probation time period before the user account is permanently deleted. As noted above in connection with FIG. 6, an administrator can restore the account by clicking the account revival link 762. The application service server then changes the user account's account type from "Deleted" to "Active".

In some embodiments, as shown in FIG. 7E, the application service server 120 allows an organization to have multiple domain names, including one primary domain name "company.com" and zero or more domain aliases "company.org", "company.tv", etc. A person having an account with the organization can access the hosted services through any domain name including the domain name aliases.

Figure 8:
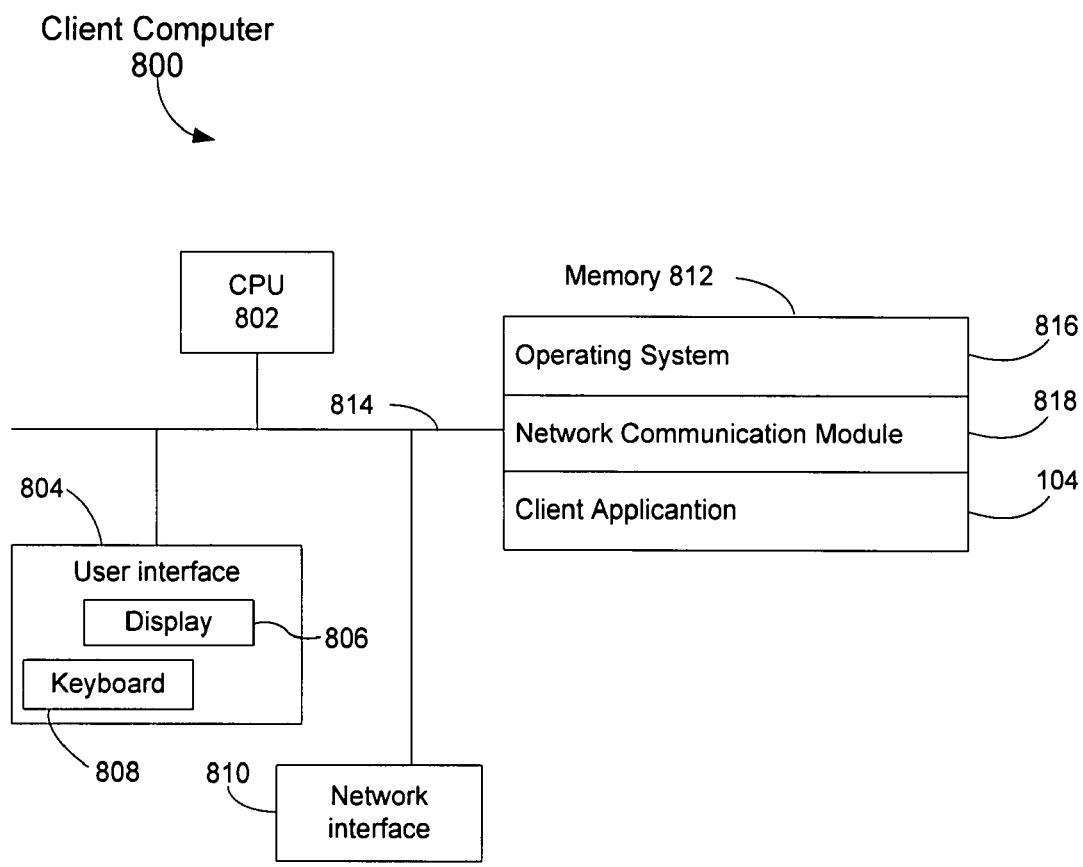
FIG. 8 is a block diagram of an exemplary client computer according to some embodiments.

FIG. 8 depicts a client computer 800 in accordance with some embodiments, which typically includes one or more processing units (CPU's) 802, one or more network or other communications interfaces 810, memory 812, and one or more communication buses 814 for interconnecting these components. The communication buses 814 may include circuitry (sometimes called a chipset) that interconnects and controls communications between system components. The client computer 800 may also include a user interface 804 comprising a display device 806 and a keyboard 808. Memory 812 may include high speed random access memory and may also include non-volatile memory, such as one or more magnetic disk storage devices. Memory 812 preferably stores the following programs, modules and data structures, or a subset or superset thereof:

- an operating system 816 that includes procedures for handling various basic system services and for performing hardware dependent tasks;
- a network communication module (or instructions) 818 that is used for connecting the client computer 800 to other computers via the one or more communication network interfaces 810 and one or more communication networks, such as the Internet, other wide area networks, local area networks, metropolitan area networks, and the like; and
- an application (or instructions) 104, such as a web browser application, for receiving a user request for a document and rendering the requested document on a computer monitor or other user interface device.

Figure 9:
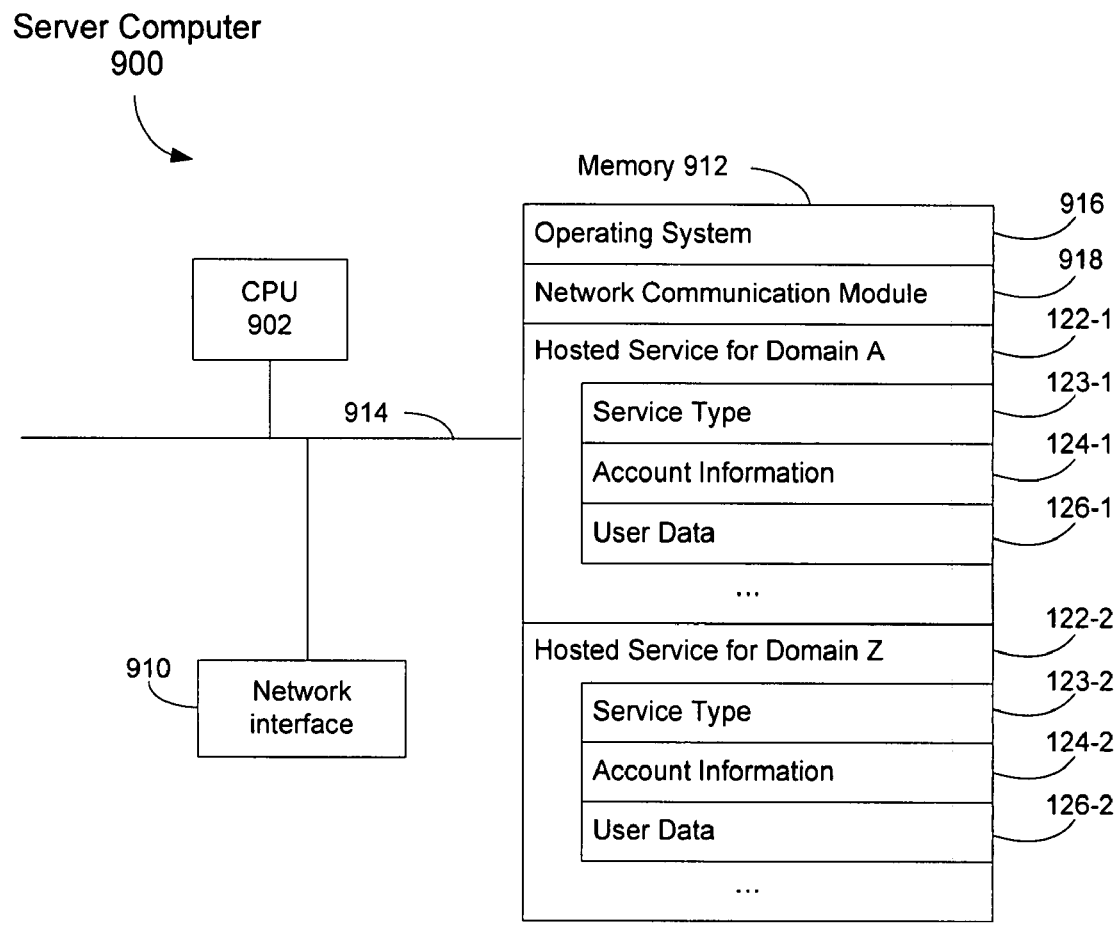
FIG. 9 is a block diagram of an exemplary application service server computer according to some embodiments.

FIG. 9 depicts a server computer 900 (e.g., an application service server 120) in accordance with some embodiments, which typically includes one or more processing units (CPU's) 902, one or more network or other communications interfaces 910, memory 912, and one or more communication buses 914 for interconnecting these components. The communication buses 914 may include circuitry (sometimes called a chipset) that interconnects and controls communications between system components. The server computer 900 may optionally include a user interface comprising a display device and a keyboard. Memory 912 may include high speed random access memory and may also include non-volatile memory, such as one or more magnetic disk storage devices. Memory 912 may optionally include one or more storage devices remotely located from the CPU(s) 902. Memory 912, or one or more of the storage devices (e.g., one or more non-volatile storage devices) in memory 912, includes a computer readable storage medium. Memory 912 or the computer readable storage medium of memory 912 preferably stores the following programs, modules and data structures, or a subset or superset thereof:

- an operating system 916 that includes procedures for handling various basic system services and for performing hardware dependent tasks;
- a network communication module (or instructions) 918 that is used for connecting the server computer 900 to other computers via the one or more communication network interfaces 910 and one or more communication networks, such as the Internet, other wide area networks, local area networks, metropolitan area networks, and the like; and
- one or more hosted service modules (or instructions) 122 for rendering services associated with different domain names, each hosted service module including:
  - a service type 123 (e.g., a limited set or a complete set of hosted service);
  - a user account information record 124 including information such as username, account status, nickname, service information, and last visit by the account owner; and
  - user data 126 such as email messages, web pages, calendars, photos, and other types of digital contents.

Figure 10:
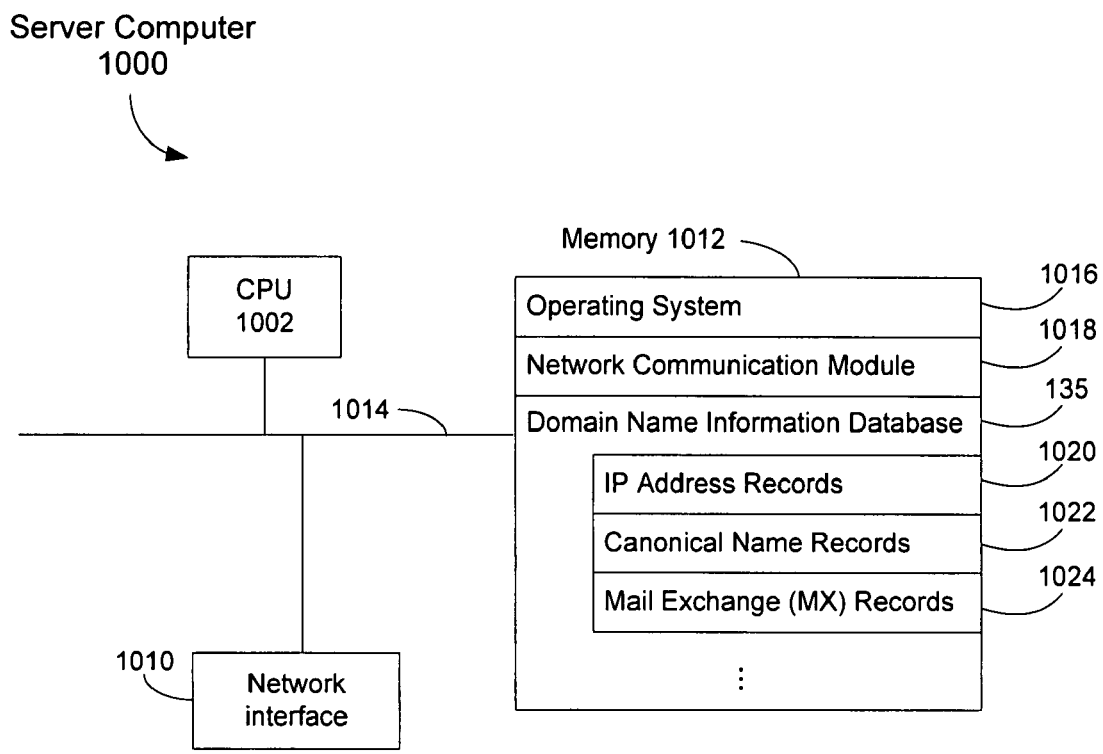
FIG. 10 is a block diagram of an exemplary domain name server computer according to some embodiments.

FIG. 10 depicts a server computer 1000 (e.g., a domain name server 130) in accordance with some embodiments, which typically includes one or more processing units (CPU's) 1002, one or more network or other communications interfaces 1010, memory 1012, and one or more communication buses 1014 for interconnecting these components. The communication buses 1014 may include circuitry (sometimes called a chipset) that interconnects and controls communications between system components. The server computer 1000 may optionally include a user interface comprising a display device and a keyboard. Memory 1012 may include high speed random access memory and may also include non-volatile memory, such as one or more magnetic disk storage devices. Memory 1012 preferably stores the following programs, modules and data structures, or a subset or superset thereof:

- an operating system 1016 that includes procedures for handling various basic system services and for performing hardware dependent tasks;
- a network communication module (or instructions) 1018 that is used for connecting the server computer 1000 to other computers via the one or more communication network interfaces 910 and one or more communication networks, such as the Internet, other wide area networks, local area networks, metropolitan area networks, and the like; and
- a domain name information database 135 for storing information associated with domain names, including IP address records 1020, canonical name records 1022, and mail exchange record 1024.

Although FIGS. 9 and 10 show a "server computer." They are intended more as functional description of the various features that may be present in a set of servers than as a structural schematic of the embodiments described herein. In practice, and as recognized by those of ordinary skill in the art, items shown separately could be combined and some items could be separated. For example, some items shown separately in FIGS. 9 and 10 could be implemented on single servers and single items could be implemented by one or more servers. The actual number of servers used to implement an application service server or a domain name service and how features are allocated among them will vary from one implementation to another, and may depend in part on the amount of data traffic that the system must handle during peak usage periods as well as during average usage periods.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. In addition, different embodiments can employ a subset of the illustrated operations and/or system components. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A computer-implemented method performed at a server having one or more processors and memory, the method comprising:
   receiving a first request for establishing hosted services associated with a user-specified domain name that designates a network domain;
   if the hosted services are not already being provided for the domain name, responding to the first request to establish hosted services associated with the user-specified domain name by:
      designating the first request as pending and providing a limited set of the hosted services in association with the first request; and
      if it can be established that a first user associated with the first request has appropriate authority to make administrative changes for the network domain designated by the domain name, providing a complete set of the hosted services requested in the first request;
   wherein the limited set of the hosted services in association with the first request includes:
   enabling an applicant of the first request to create a set of user accounts; and
   enabling a user associated with one of the user accounts to log into the user account and view digital contents associated with the user account.

2. The method of claim 1, further comprising:
   denying the first request and terminating the limited set of the hosted services if it is not shown within a predetermined period of time that the first user has the appropriate authority.

3. The method of claim 1, further comprising:
   while providing the limited set of the hosted services in association with the first request,
      receiving a second request for hosted services associated with the same domain name;
      requesting a second user associated with the second request to establish that the second user has appropriate authority to make administrative changes for the network domain designated by the domain name; and
      terminating the limited set of the hosted services in association with the first request and providing a complete set of the hosted services requested in the second request if the second user establishes that the second user has appropriate authority to make administrative changes for the network domain designated by the domain name with a predefined time period.

4. The method of claim 3, wherein requesting the second user associated with the second request to establish that it has appropriate authority to use the domain name includes:
   requesting the second user to update a data record associated with the domain name in a predefined manner;
   designating the second user as a legitimate user of the domain name if the data record has been updated in the predefined manner; and
   designating the second user as an illegitimate user of the domain name if the data record has not been updated in the predefined manner.

5. The method of claim 4, wherein updating the data record includes changing a parameter in the data record to a particular value unique to the applicant.

6. The method of claim 1, further comprising:
   determining that the complete set of the hosted services is being provided in association with a third request associated with the domain name;
   denying the first request in accordance with the determination that the complete set of the hosted services is being provided in association with the third request associated with the domain name.

7. The method of claim 1, further comprising:
   charging a fee before providing the limited set of the hosted services in association with the first request; and
   providing the limited set of the hosted services in association with the first request after receiving the fee.

8. The method of claim 1, further comprising:
   determining whether the user-specified domain name exists or not;
   denying the first request if the user-specified domain name does not exist; and
   providing information relating to obtaining the user-specified domain name.

9. The method of claim 1, wherein the domain name is an Internet domain name.

10. The method of claim 1, wherein the limited set of the hosted services in association with the first request further includes:
enabling a user associated with one of the user accounts to send up to a predefined number of emails.

11. The method of claim 1, wherein viewing digital contents includes checking an email message directed to the user account.

12. The method of claim 1, wherein the limited set of the hosted services excludes enabling the user to generate any digital content using the user account.

13. The method of claim 1, wherein the hosted services comprise email services.

14. The method of claim 1, wherein the hosted services comprise one or more of communication services and digital content management services.

15. The method of claim 1, wherein the limited set of the hosted services in association with the first request excludes enabling a user to receive emails.

16. The method of claim 1, further comprising determining whether the hosted services are not already being provided for the domain name.

17. A computer system, comprising:
memory;
at least one processor; and
at least one program stored in the memory and executed by the at least one processor, the at least one program including:
instructions for receiving a first request for establishing hosted services associated with a user-specified domain name that designates a network domain;
instructions for responding to the first request to establish hosted services associated with the user-specified domain name if the hosted services are not already being provided for the domain name, including:
instructions for designating the first request as pending and providing a limited set of the hosted services in association with the first request; and
instructions for providing a complete set of the hosted services requested in the first request if it can be established that a first user associated with the first request has appropriate authority to make administrative changes for the network domain designated by the domain name;
wherein the limited set of the hosted services in association with the first request includes:
enabling an applicant of the first request to create a set of user accounts; and
enabling a user associated with one of the user accounts to log into the user account and view digital contents associated with the user account.

18. The computer system of claim 17, further comprising:
instructions for denying the first request and terminating the limited set of the hosted services if it is not shown within a predetermined period of time that the first user has the appropriate authority.

19. The computer system of claim 17, further comprising:
while providing the limited set of the hosted services in association with the first request,
instructions for receiving a second request for hosted services associated with the same domain name;
instructions for requesting a second user associated with the second request to establish that the second user has appropriate authority to make administrative changes for the network domain designated by the domain name; and
instructions for terminating the limited set of the hosted services in association with the first request and providing a complete set of the hosted services requested in the second request if the second user establishes that the second user has appropriate authority to make administrative changes for the network domain designated by the domain name with a predefined time period.

20. The computer system of claim 19, wherein the instructions for requesting the second user associated with the second request to establish that it has appropriate authority to use the domain name include:
instructions for requesting the second user to update a data record associated with the domain name in a predefined manner;
instructions for designating the second user as a legitimate user of the domain name if the data record has been updated in the predefined manner; and
instructions for designating the second user as an illegitimate user of the domain name if the data record has not been updated in the predefined manner.

21. The computer system of claim 20, wherein the instructions for requesting the second user to update the data record includes instructions for changing a parameter in the data record to a particular value unique to the applicant.

22. The computer system of claim 17, further comprising:
instructions for determining that the complete set of the hosted services is being provided in association with a third request associated with the domain name;
instructions for denying the first request in accordance with the determination that the complete set of the hosted services is being provided in association with the third request associated with the domain name.

23. The computer system of claim 17, further comprising:
instructions for charging a fee before providing the limited set of the hosted services in association with the first request; and
instructions for providing the limited set of the hosted services in association with the first request after receiving the fee.

24. The computer system of claim 17, further comprising:
instructions for determining whether the user-specified domain name exists or not;
instructions for denying the first request if the user-specified domain name does not exist; and
instructions for providing information relating to obtaining the user-specified domain name.

25. The computer system of claim 17, wherein the hosted services comprise email services.

26. The computer system of claim 17, wherein the hosted services comprise one or more of communication services and digital content management services.

27. The computer system of claim 17, wherein the limited set of the hosted services in association with the first request further includes:
enabling a user associated with one of the user accounts to send up to a predefined number of emails.

28. The computer system of claim 17, wherein the limited set of the hosted services in association with the first request excludes enabling a user to receive emails.

29. A non-transitory computer readable storage medium storing one or more programs for execution by one or more processors, the one or more programs comprising:

instructions for receiving a first request for establishing hosted services associated with a user-specified domain name that designates a network domain;

instructions for responding to the first request to establish hosted services associated with the user-specified domain name if the hosted services are not already being provided for the domain name, including:

instructions for designating the first request as pending and providing a limited set of the hosted services in association with the first request; and instructions for providing a complete set of the hosted services requested in the first request if it can be established that a first user associated with the first request has appropriate authority to make administrative changes for the network domain designated by the domain name;

wherein the limited set of the hosted services in association with the first request includes:

enabling an applicant of the first request to create a set of user accounts; and enabling a user associated with one of the user accounts to log into the user account and view digital contents associated with the user account.

30. The non-transitory computer readable storage medium of claim 29, wherein the limited set of the hosted services in association with the first request further includes:

enabling a user associated with one of the user accounts to send up to a predefined number of emails.

31. The non-transitory computer readable storage medium of claim 29, wherein the limited set of the hosted services in association with the first request excludes enabling a user to receive emails.

* * * * *

UNITED STATES PATENT AND TRADEMARK OFFICE
CERTIFICATE OF CORRECTION

PATENT NO. : 8,219,678 B2  
APPLICATION NO. : 11/706170  
DATED : July 10, 2012  
INVENTOR(S) : Manolache et al.

Page 1 of 1

It is certified that error appears in the above-identified patent and that said Letters Patent is hereby corrected as shown below:

In Column 14, line 33, please delete "with" and add -- within --;

In Column 16, line 10, please delete "with" and add -- within --.

Signed and Sealed this  
Twenty-eighth Day of August, 2012

David J. Kappos  
*Director of the United States Patent and Trademark Office*